United States Patent [19]

Roca-Nierga

[11] Patent Number: 4,470,393

[45] Date of Patent: Sep. 11, 1984

[54] INJECTION PUMPS FOR INTERNAL-COMBUSTION ENGINES

[75] Inventor: Manuel Roca-Nierga, Barcelona, Spain

[73] Assignee: Spica S.p.A., Leghorn, Italy

[21] Appl. No.: 368,116

[22] Filed: Apr. 14, 1982

[30] Foreign Application Priority Data

Apr. 18, 1981 [DE] Fed. Rep. of Germany ....... 3115721

[51] Int. Cl.³ .............................................. F02D 7/00
[52] U.S. Cl. ................................................... 123/387
[58] Field of Search ................................ 123/385–388

[56] References Cited

U.S. PATENT DOCUMENTS

| | | | |
|---|---|---|---|
| 2,165,657 | 7/1939 | Schagren | 123/387 |
| 2,500,618 | 3/1950 | Pugh et al. | 123/385 |
| 3,049,867 | 8/1962 | Gillespie | 123/387 |
| 3,667,439 | 6/1972 | Muir | 123/387 |

FOREIGN PATENT DOCUMENTS

| | | | |
|---|---|---|---|
| 1262069 | 2/1968 | Fed. Rep. of Germany | 123/387 |
| 293532 | 12/1953 | Switzerland | 123/387 |
| 177386 | 3/1922 | United Kingdom | 123/386 |

Primary Examiner—Charles J. Myhre
Assistant Examiner—Magdalen Moy
Attorney, Agent, or Firm—Diller, Ramik & Wight

[57] ABSTRACT

This invention relates to the injection pumps for internal-combustion engines to which the fuel is supplied by a feed pump and aims at obtaining a speed signal by adjusting the pressure within a chamber (35) closed by the bias of centrifugal masses (18) of the governor (15) associated with the injection pump (11).

5 Claims, 3 Drawing Figures

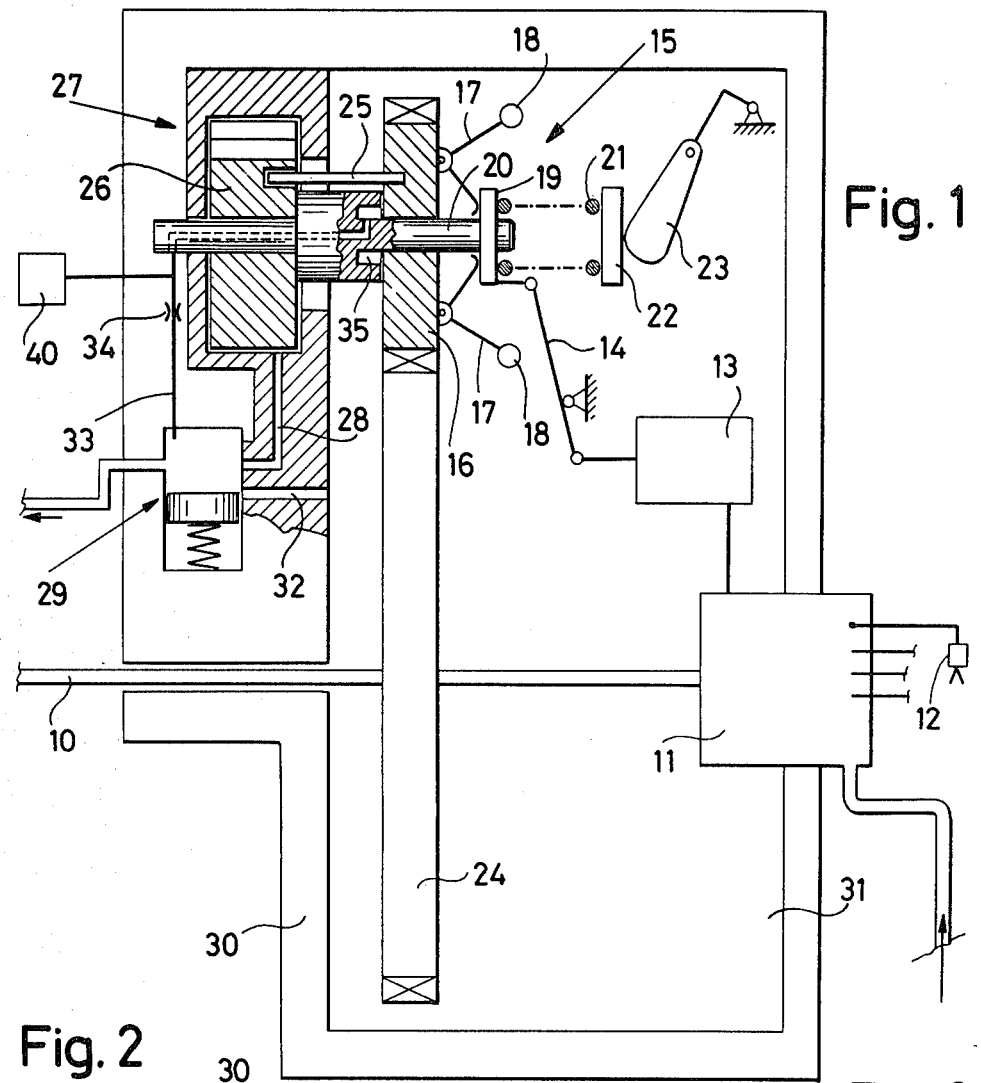
Fig. 1
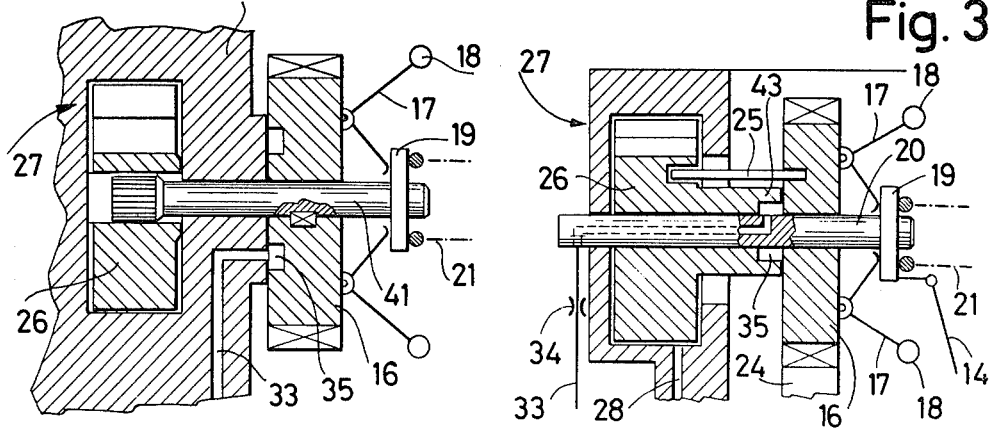
Fig. 2
Fig. 3

INJECTION PUMPS FOR INTERNAL-COMBUSTION ENGINES

In injection pumps for internal-combustion engines there are working parameters which must be adjusted as a function of the engine rpm and thus of the rpm of the injection pump driven thereby.

The necessity thus exists of taking a signal which is a function of the speed of the pump concerned.

The conventional pumps have, associated therewith, a centrifugal governor which has a moving element driven by centrifugal masses against spring bias. However, the motion of such a governor is not a function of the rpm of a governor in a reliable way, because the bias of the springs is varied by the regulation members for the engine rpm.

The pressure of delivery of the feed pump which feeds fuel to the injection pump is also a function of the rpm and is increased concurrently therewith according to a certain relationship which is given by the pressure drop which is experienced in the interior of a pressure-limiting valve associated to the delivery according to the conventional art.

This pressure signal, however, is not sufficiently reliable as a speed signal because it is a very inaccurate function of the square of the rpm and, moreover, it is sensitive to the viscosity of the fuel, and the latter varies as the temperature changes.

An objective of the present invention is to do away with the defects indicated above by providing a structure of an injection pump fed by a feed pump, which is defined, as a whole, as an injection unit for an internal-combustion engine, in which means are provided for obtaining a pressure signal which is an unequivocal function, and a well defined one, of the engine rpm, the engine driving said pump.

The adoption of such a structure may entail additional and beneficial features, more particularly the possibility of supporting with a very slight friction the body of the centrifugal governor of the injection pump.

In order that the objects and the features of the invention may be best understood, a few practical exemplary embodiments will now be described, as illustrated in the accompanying drawings, wherein:

FIG. 1 is a diagrammatical overall view of an injection unit made according to this invention, FIG. 2 is a fragmentary view of a modification of the unit of FIG. 1, and FIG. 3 is an additional modification, in a showing akin to that of FIG. 2.

FIG. 1 shows an injection unit comprising a body 30 in which a shaft 10 is supported which drives the pumping members of an injection pump proper, indicated generally at 11 and which is not described in more detail since it is conventional as itself and is intended to convey and deliver a stream of fuel to every one of the injectors 12 under an appropriate pressure. The unitary rate of delivery of the pump 11 is controlled by conventional adjustment means symbolically indicated at 13: such means are driven by the motion of a lever 14 which is rockable and is connected to the centrifugal governor, generally indicated at 15.

The governor 15 consists of a body 16 which is rotated and to which levers 17 are linked, which are terminated at their distal ends by centrifugal masses 18, the other lever ends resting on a disk 19 which slides on an extension of the fixed arbor 20 which carries the body 16 aforesaid. On the disk 19 bears a spring 21, the bias of which is adjustable as to its position by a cam 23 acting against a spring seat 22. The body 16 has, on its peripheral surface, a crenellation which meshes with the gear 24 keyed to the shaft 10.

A pin 25 makes an entity, relative to the rotational motion, of the body 16 and the rotor 26 of a conventional paddle pump, the latter being generally indicated at 27, said rotor being mounted on the same arbor 20 aforementioned.

In the delivery conduit 28 of the pump 27 which feeds the pump 11, a valve 29 is mounted for regulating the pressure of delivery by limiting it and discharging the excess delivery volume into a chamber 31 as defined by the body 30, through the duct 32.

From the first section under pressure of the delivery conduit, that is, from the same chamber of the valve 29, a conduit 33 is branched off, which has a throttled passageway 34, to feed a chamber 35 formed on the face of the arbor 20 which abuts the body member or element 16.

It can be seen from the arrangement of parts shown in the drawing, that the pressrue within the chamber 35 is maintained at the value which originates upon the member 16 an axial thrust equalling the axial bias thrust of the masses 18 which move the disk 19.

Said pressure is maintained at the expense of a seeping between the contacting surfaces of the body, member, or member 16 and the abutting face of the arbor 20 which axially supports the member, body or element 16: this seeping takes place as the pressure within the chamber 35 imparts to the member 16 a thrust which overcomes the thrust received thereby in the form of an axial bias from the masses 18.

It occurs, therefore, that the pressure in the chamber 35 is maintained at a value which is closely bound to the action of the centrifugal masses 18, which, in their turn, act according to a law of variation which is preselected when designing the centrifugal governor, with an accuracy responsive to the pump rpm and thus to the engine rpm in a fashion which, inter alia, is independent of the viscosity of the pumped fuel. Such a pressure, in any case, will be increased as the engine rpm is increased.

A sensor 40, installed on a duct (unnumbered) branching off from the duct 33 downstream of the throttled section 34, is thus a component part which is capable of driving correctly any mechanism of the injection pump 11 which is suppposed to work in a close correlation with the engine rpm.

In addition, it should be noted that the liquid seeping out of the chamber 35 provides a hydraulic lubricating pad on the surface of member 16 contacting its supporting member, so that both friction and wear due to sliding are suppressed.

It is apparent that the diagrammatical arrangement shown in FIG. 1 may be variously embodied from the structural standpoint.

For example, FIG. 2 shows that the member 16 can be mounted integrally with an arbor 41 supported for rotation in the body 30 and united for rotation to the rotor 26 of the pump 27 to drive the latter to rotation.

The chamber 35 can be formed in the member 16 instead of the body 30, the two arrangements being functionally equivalent.

Yet another alternative embodiment is shown in FIG. 3. The shaft 20 is placed in fixed position again but the member 16 now rests directly on an extension 43 of the pump rotor and is rotated concurrently therewith. The liquid pad which, at any rate, is formed between said two members, has a lesser importance now because there is no relative motion therebetween. The linkage 25, at any rate, should leave to the element 16, as in FIG. 1, the freedom of axial motion so as to permit that liquid may emerge from the chamber 35.

In FIGS. 2 and 3 like reference numerals are used to connote like parts as shown in the embodiment of FIG. 1.

It is apparent for anyone skilled in the art that the transversal surface of the chamber 35 must so be sized that the thrust originated by the pressure as adjusted by the valve 29 exceeds the axial thrust produced by the centrifugal masses 18 on the element 16, irrespective of the engine rpm and thus also of the pump rpm.

I claim:

1. An injection unit for an internal-combustion engine comprising a rotary feed pump having a delivery duct connected to an injection pump (11) a centrifugal governor (15) being provided to regulate the unitary rate of delivery of the injection pump (11), a rotary member (16) being also provided, rotating concurrently with the rotary feed pump and on which centrifugal masses (18) are linkably mounted which are displaced by the action of centrifugal forces to displace, against the bias of resilient means (21) creating forces acting in a first direction, a member axially in a second direction opposite the first direction (19) for regulating the rate of delivery of said injection pump, characterized by said rotary member (16) of the governor (15) having a surface opposing an abutment surface of an axial supporting member (20, 30, 43) and defining therewith a chamber (35), said chamber (35) communicating with the delivery duct of the rotary feed pump iva a conduit (33) throttled by a restricted section (34), the pressure of the liquid contained in said chamber (35) acting in a direction opposite said first direction against and to counteract the axial bias of said resilient means and said centrifugal masses (18) of said centrifugal governor to establish pressure values which are increased as the rpm of the governor is increased, and means (40) responsive to the pressure values and connected to said chamber (35) to deliver a signal which is a function of said rpm.

2. An injection unit according to claim 1, characterized in that said chamber (35) is formed in the opposing surface of the rotary member (16).

3. An injection unit according to claim 1, characterized in that said chamber (35) is formed in the opposing surface of the rotating member (16), said axial supporting member being fixed and nonrotatable, and a conduit (33) connected to said delivery duct which opens into said chamber (35).

4. An injection unit according to claim 1, characterized in that said chamber (35) is formed in the opposing surface of the rotary member (16) said axial supporting member being rotatable, a conduit connected to said delivery duct and being formed in part in an arbor (20) which supports said rotary member (16,43) and opens into said chamber (35).

5. An injection unit according to any of claims 2, 3 and 4, characterized in that said rotary member (16) of the governor (15) is circumferentially and directly secured to a rotor (26) of the rotary feed pump to drive the later synchronously with said rotary member (16).

* * * * *